United States Patent [19]
Varrin, Jr.

[11] Patent Number: 5,280,967
[45] Date of Patent: Jan. 25, 1994

[54] DEVICE FOR INDICATING THE PROPER INSTALLATION OF FITTINGS

[75] Inventor: Robert D. Varrin, Jr., Newton, Mass.

[73] Assignee: Donald Travis, Granite Springs, N.Y.; a part interest

[21] Appl. No.: 858,666

[22] Filed: Mar. 27, 1992

[51] Int. Cl.$^5$ .................................................. F16L 35/00
[52] U.S. Cl. ............................... 285/93; 285/382.7; 285/915; 411/11; 29/407
[58] Field of Search ............. 285/93, 340, 902, 382.7, 285/915; 29/407; 411/9, 10, 11; 403/27

[56] References Cited

U.S. PATENT DOCUMENTS

| 2,464,152 | 3/1949 | Ralston | 411/11 |
| 3,287,813 | 11/1966 | Lennon et al. | 285/93 X |
| 4,919,455 | 4/1990 | Yoshiro | 285/93 X |
| 4,925,217 | 5/1990 | Ketcham | 285/93 |

FOREIGN PATENT DOCUMENTS 303307 12/1989 Japan ............................. 411/11

Primary Examiner—Dave W. Arola
Attorney, Agent, or Firm—Rodman & Rodman

[57] ABSTRACT

The mechanical stress indicator includes two stress indicating rings disposed between engagable fasteners. The stress indicating rings can assume three distinct cooperative positions, corresponding to a less than optimally tight condition of the fastener, an optimum tightness condition and an overtight condition. When the fastener arrangement is in the less than optimally tight condition the mos visually predominant surfaces are of a first code, which can be a first color. When the fastener arrangement is tightened to an optimum tightness condition the stress indicator is deflected and the most visually predominant surfaces, which differ from those of the less than optimally tight condition, are of a second code, which can be a second color that corresponds with the optimum torque condition. When the fastener arrangement is tightened to an overtight condition the stress indicating rings are deflected to a third position wherein the most visually predominant surfaces are of a third code, which can be a third color corresponding to the overtight condition. The stress indicator can include a fixed non-deflectable base ring that is also coded with a color to cooperate with the deflectable rings. A deflector stub can be formed on one of the fastener members to facilitate deflection of the stress indicator rings from an optimum tightness condition to an overtight condition.

17 Claims, 3 Drawing Sheets

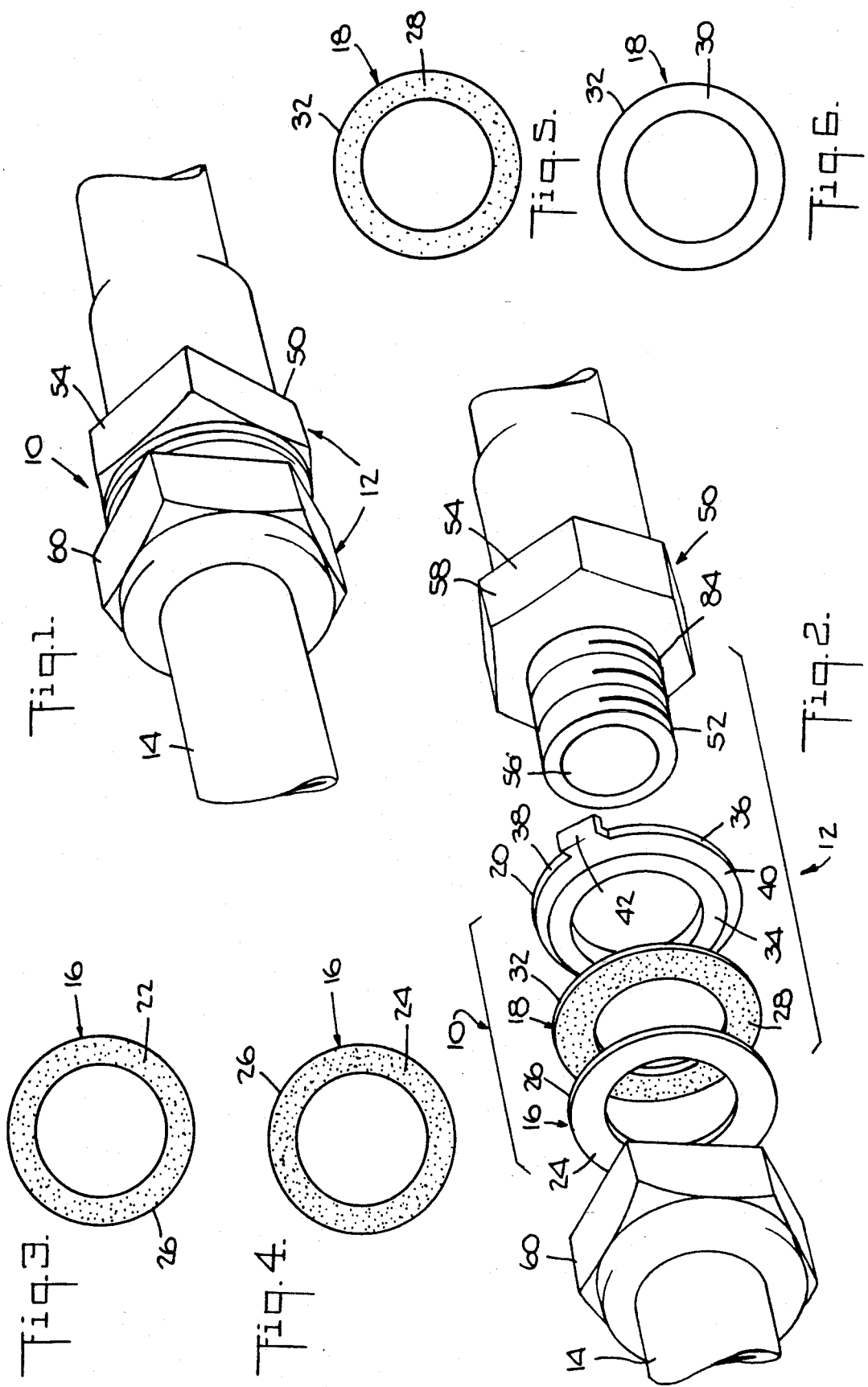

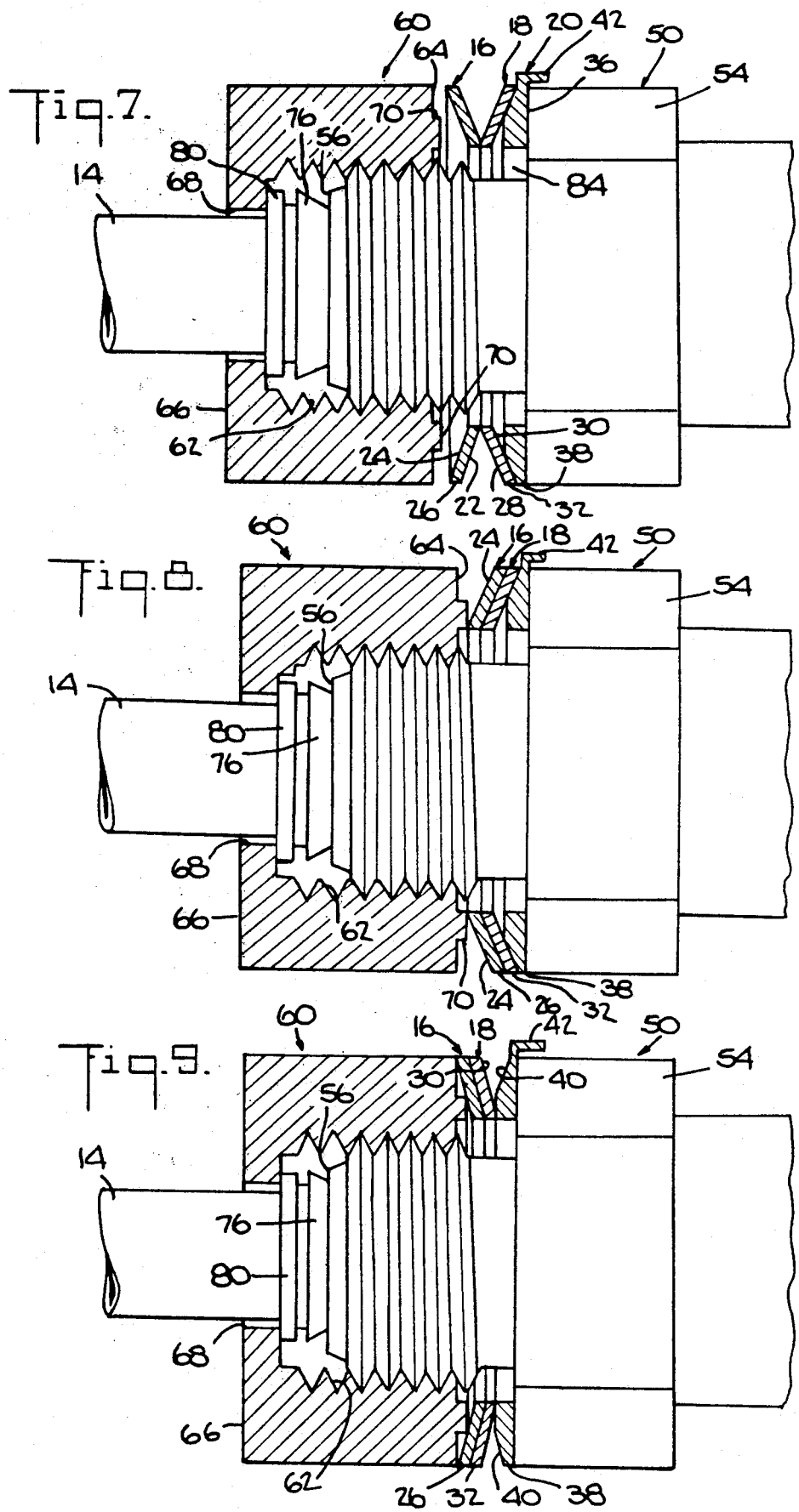

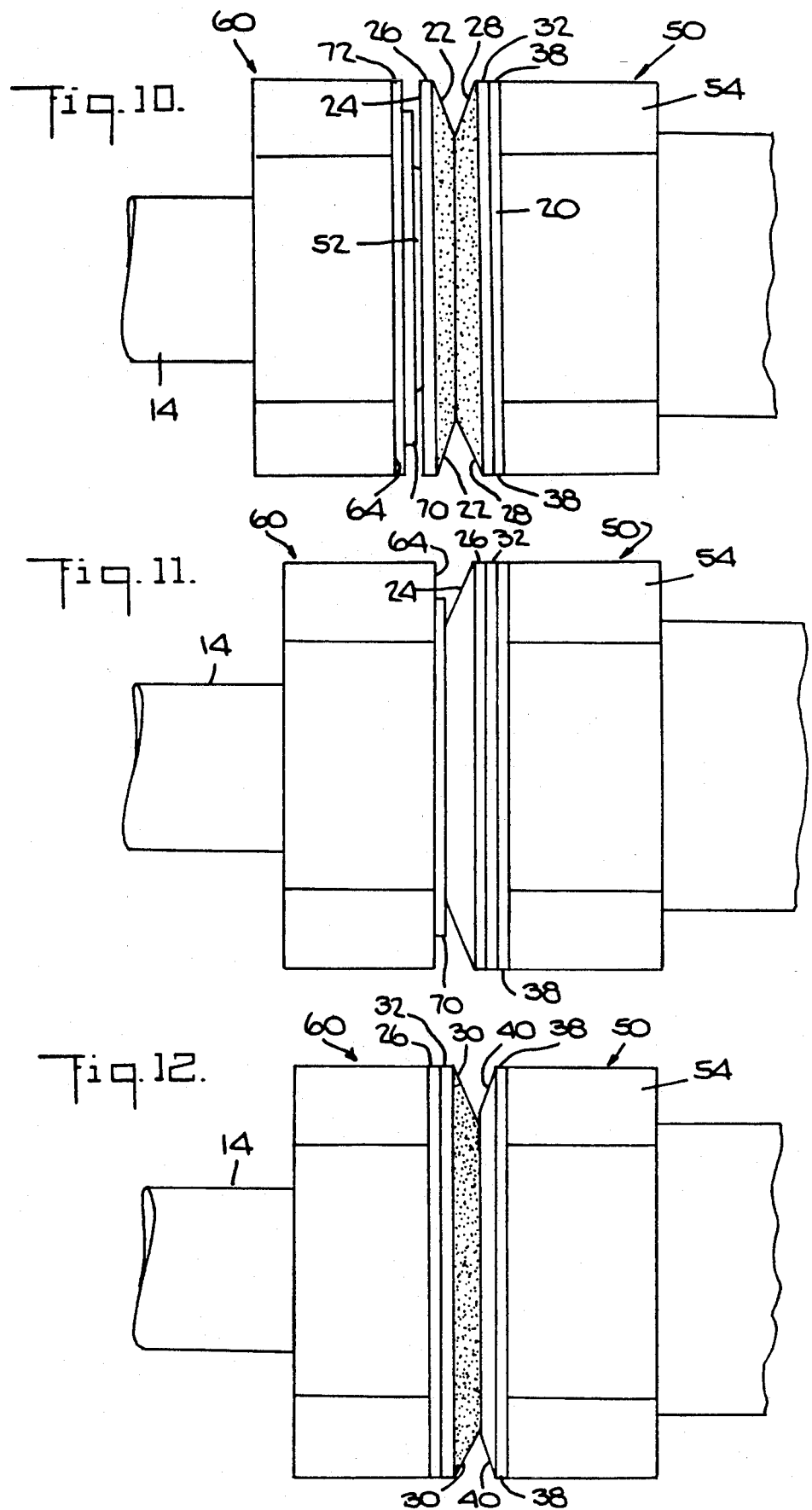

DEVICE FOR INDICATING THE PROPER INSTALLATION OF FITTINGS

BACKGROUND OF THE INVENTION

This invention relates to devices for indicating proper installation of a fitting or fastener and more particularly to a mechanical stress indicator that visually indicates whether fastener or fitting is less than optimal, optimal or overtight.

The invention is especially applicable to fittings which rely on swaging to connect a tube to a male or female thread. Such fittings, a type of which, for example, is sold under the trademark Swagelok ®, include a male connector, a nut and two internal annular front and back ferrules which receive a tube. The male connector is externally threaded and has an internally tapered mouth that complements the outside taper of the front ferrule. The nut, which accommodates the back ferrule, is partially threaded and has a reduced unthreaded opening that accommodates the tube.

When the nut is tightened onto the male connector it causes the back ferrule to force the tapered front ferrule into the tapered mouth of the male connector. This forcing action compresses the tapered ferrule against the outside diameter of a preinstalled tube thereby binding the fitting to the tube to the extent that the tube yields circumferentially thus providing a mechanical seal. The term swaging, as used herein, is intended to mean the yielding of a tube circumferentially by a conical ferrule in a compression-type fitting.

If the tightening torque between the male connector and the nut is less than optimal the amount of yielding or swaging is less than optimal and the seal between the tube and the fitting will leak. If the tightening torque between the male connector and the nut is too tight, the tube and/or the front ferrule can excessively deform in a manner that prevents a leaktight seal between the tube and the fitting. Excessive deformation of the tube and/or ferrule can render subsequent removal of the tube/ferrule combination from the fitting difficult or impossible. When the tightening torque between the nut and the male connector is at an optimum level, the amount of swaging between the ferrule and the tube is optimum and the fitting parts cooperate to provide a leaktight seal around the tube, and between the ferrule and the nut.

Since a fitting normally has no built-in stress gauges, torque indicators or other means of assessing the appropriate amount of swaging, it is often difficult to recognize when a condition of optimum tightness is achieved. Although a torque wrench can measure the tightening torque applied to a fitting, such wrench may not be available at a time of need or may be inconvenient to use because of space requirements. Also, the use of torque measurements as a means of assessing the proper swaging of the tube/ferrule combination can unduly complicate an installation procedure.

One known installation procedure prescribed by a fitting manufacturer suggests initially tightening the fitting to a condition of finger tightness, scribing the nut at a 6 o'clock position and tightening the nut 1¼ turns. The problem with such instructions is that finger tightness is an arbitrary condition and a scribing tool may not be available to scribe a nut when a fitting is being installed.

Furthermore, even if the manufacturers' installation instructions are followed, the tightness of a fitting can be inconsistent because of discretionary interpretations of finger-tightness and 1¼ turns. Unfortunately, if a fitting is overtightened the tube and the ferrules which help provide the seal can be damaged. Such damage is not visually apparent, and once a fitting has been damaged because of overtightness, the damage cannot be undone.

Another known method of tightening a fitting to a condition of optimum torque includes use of a limit gauge that fits between the nut and the male connector. However, gauges are often unavailable or improperly used. Furthermore, if a fitting is overtightened and then loosened to satisfy a gauge measurement, any damage that may have been caused by overtightness cannot be cured by a subsequent torque reduction.

Visual inspection of an installed fitting will not indicate whether the tightening torque is too loose, too tight or just right. Visual inspections also do not provide adequate corroboration that a fitting is leaktight, or that proper tightening procedures were followed.

Stress indicators used in combination with fasteners are helpful for installers and inspectors if such indicators provide a visual indication of stress or torque that is applied to the fastener. Some known devices for indicating the stress condition or tightness of a mechanical component or fastener are shown in U.S. Pat. Nos. 2,824,481; 3,153,974; 3,224,316; 3,304,827; 3,474,701; 3,589,234; 4,170,163 and 4,636,120. However, such devices are generally built into the fastener and are not economical or feasible for use with a tube fitting of the type described.

It is thus desirable to provide a compact, simply structured mechanical stress indicator for a fastener or fitting that visually indicates, while an installation torque is being applied to the fastener or fitting and after the torque has been applied, whether the resulting installation or swage is less than optimal, optimal or overtight.

OBJECTS AND SUMMARY OF THE INVENTION

Among the several objects of the invention that may be noted are the provision of a novel mechanical stress indicator, a novel mechanical stress indicator that provides a visual indication of whether a tightening torque, fastener or fitting installation or swage is less than optimal, optimal or overtight, a novel mechanical stress indicator that is easily adapted to existing fastener and fitting devices, a novel mechanical stress indicator that visually displays during stress buildup when a tightening torque, fastener or fitting installation or swage has reached a condition of optimum tightness in a fastener or fitting to alert against further tightening of the fastener or fitting, a novel mechanical stress indicator that is coded to visually indicate different levels of tightness or torque, a novel mechanical stress indicator that facilitates inspection of the tightness condition of a fastener or fitting, a novel mechanical stress indicating device that obviates the need for gauging, scribing or relying on the arbitrary judgment of an installer in tightening a fastener or fitting, and a novel method of showing the level of torque imposed on a fastener or fitting.

Other objects and features of the invention will be in part apparent and in part pointed out hereinafter.

In accordance with one embodiment of the invention, the mechanical stress indicator includes a pair of deflectable stress indicator rings interposed between engagable connecting members of a fastener or fitting arrangement such as a tube fitting.

In one embodiment of the invention each of the deflectable members is an annular ring, which in an unstressed condition, has a predetermined concave face and a predetermined convex face. When a predetermined axial movement corresponding to a predetermined stress is imposed on the ring, the ring deflects such that the concave face is rendered convex and the convex face is rendered concave. It should be noted that the ring deflection is not gradual, but occurs instantaneously, after producing an audible sound when such deflection occurs.

The stress indicator rings are initially oriented on the fastener such that the convex face of one ring is adjacent the convex face of the other ring whereby the convex faces diverge from each other. When the rings are viewed in a radial direction the diverging convex faces are the predominant visually discernable surfaces. Each of the concave, convex and edge surfaces of the stress indicating rings are coded preferably by color to indicate whether an imposed axial movement of the fastener nut, for example, which is also translated to the stress rings and corresponds to a predetermined torque or stress imposed on the fastener or fitting, is less than optimal, optimal or overtight.

During tightening of the fastener members, a stress is imposed on the stress indicating rings corresponding to the amount of axial movement applied to the fastener nut. As long as the imposed axial movement of the fastener nut, due to turning or torquing of the nut, is less than optimal the stress rings remain in their initially installed orientation which is color coded with a first color code, for example, to indicate the less than optimal stress condition, or swage condition in a fitting.

When a tightening torque is increased from a less than optimally tight condition to a condition of optimum tightness, one of the stress indicator rings is caused to deflect or flip over against the other stress ring such that both rings nest or overlap one another in a first common conically inclined direction. The outside nestable ring thus has a predominant visually discernable exposed convex surface that is coded with a second color, for example, to indicate a condition of optimum tightness. The optimum tightness color code corresponds with a known optimum torque level, stress or swage condition on the fastener or fitting that provides a leaktight seal in a tube fitting, for example.

If the tightening torque is increased beyond the optimum torque condition to a predetermined overtight torque condition, due to additional axial movement of the fastener nut, both of the stress indicator rings are deflected such that the initially concave faces of each ring are rendered convex and the initially concave surfaces are rendered convex. The outside and inside nesting positions of the rings become reversed and the previous inside nestable ring, which is now the outside nestable ring, has the predominant visually discernable surface that is coded with a third color, for example, to indicate the overtight torque condition.

A non-deflectable base ring can also be used and is color coded to cooperate with the deflectable stress rings. In addition a deflector projection can be provided as a separate member or incorporated in one of the fastener members to facilitate stress ring deflection.

The invention accordingly comprises the constructions and method hereinafter described, the scope of the invention being indicated in the claims.

DESCRIPTION OF THE DRAWINGS

In the accompanying drawings,

FIG. 1 is a simplified perspective view of a mechanical stress indicator incorporating one embodiment of the invention as shown on a tube fitting;

FIG. 2 is an exploded perspective view thereof with inner ferrules being omitted for the sake of clarity;

FIG. 3 is a side view of one of the stress indicating rings thereof;

FIG. 4 is an obverse side view of the stress indicating ring of FIG. 3;

FIG. 5 is a side view of another of the stress indicating rings thereof;

FIG. 6 is an obverse side view of the stress indicating ring of FIG. 5;

FIG. 7 is a simplified sectional view thereof with the stress indicators positioned to indicate a loose condition of the tube fitting;

FIG. 8 is a view similar to FIG. 7 with the stress indicators positioned to indicate an optimum tightness condition of the tube fitting;

FIG. 9 is a view similar to FIG. 8 with the stress indicators positioned to indicate an overtight condition of the tube fitting;

FIG. 10 is a front view substantially corresponding to FIG. 7, but including a separate deflector member;

FIG. 11 is a front view corresponding to FIG. 8;

FIG. 12 is a front view corresponding to FIG. 9.

Corresponding reference characters indicate corresponding parts throughout the several views of the

DETAILED DESCRIPTION OF THE INVENTION

A mechanical stress indicator incorporating one embodiment of the invention is generally indicated by the reference number 10 in FIG. 1.

The stress indicator 10 is disposed on a fastener arrangement 12, such as a known fitting connectable to a tube 14.

The stress indicator 10 includes a pair of stress indicating rings 16 and 18 and a base ring 20. The stress indicating rings 16 and 18 are of the type also known as Belleville washers. The rings 16 and 18 are annular springs which can be formed of a suitable metal or plastic. Material selection may be based upon such criteria as the temperature conditions of the installation. In cross section the rings 16 and 18 have a profile similar to a frustum of a cone.

Referring to FIGS. 2, 7 and 10 the stress indicating ring 16 in an unstressed condition has a convex face 22 which can be coded with a first distinctive color such as blue, a concave face 24 which can be coded with a second distinctive color such as white, and a peripheral edge 26 which can also be color coded white. The stress indicating ring 18, which is substantially identical to the stress indicating ring 16, has a convex face 28 which can be color coded blue, a concave face 30 which can be coded with a third distinctive color red, and a peripheral edge 32 which can be color coded white.

For certain applications the stress indicating rings can be of different thickness or conical angle.

It is contemplated that the color codes are applied in any suitable known manner such as by painting, coating or plating. The color coding can be applied to all or part of the selected surfaces. The colors used are a matter of choice and depend in part upon illumination conditions during installation or special requirements of a manufacturer or user, for example.

The base ring 20, which can be formed of metal or plastic, includes a minor base surface 34, a major base surface 36, a peripheral edge 38 and a tapered conical surface 40 which can be color coded red, extending between the minor base 34 and the peripheral edge 38 An optional axially projecting flange 42 is formed at the major base surface 36.

The fastener arrangement 12 includes a male connector 50 having a male thread 52, a hexagonal flange 54 and an internally tapered mouth 56 at one end of the male thread 52. The hexagonal flange 54 includes flat surfaces such as 58. Unless otherwise indicated the component parts of the fastener arrangement 12 are of the type manufactured under the trademark Swagelok ®.

The fastener arrangement 12 further includes a nut 60 having an internal threaded portion 62 that is threaded up to an end surface 64 of the nut 60. An opposite end 66 of the nut 60 is formed with a reduced opening 68 (FIG. 7). The nut 60 is formed with an annular axially projecting deflector stub 70 at the end surface 64. The deflector stub 70 is a feature of the invention and is not a conventional feature of the Swagelok ® nut 60.

As an alternative the deflector stub 70 can be provided on a separate deflector washer member 72 formed of metal or plastic as shown in FIG. 10. The deflector member 72 is arranged adjacent the end surface 64 of the nut 60, and the axial annular projection of the deflector stub 70 is of a predetermined selected magnitude to cooperate with the rings 16, 18 and the base ring 20.

The fastener arrangement 12 further includes a conventional front ferrule 76 and a conventional back ferrule 80. The front ferrule 76, which has a tapered conical outside surface and a predetermined inside diameter, is receivable in the tapered mouth portion 56 of the male connector 50. The back ferrule 80, which is in the shape of a stepped ring, having substantially the same internal diameter as that of the front ferrule 76, is received within the nut 60 to bear against the front ferrule 76 in the manner shown in FIGS. 7-9 when the nut 60 is engaged on the male connector 50.

The tube 14 is preinstalled in the nut 60 for accommodation in the front ferrule 76 and the back ferrule 80.

In using the mechanical stress indicator 10, the base ring 20 is slipped onto the threaded portion 52 of the male connector 50, after temporarily removing the nut 60, such that the projecting flange 42 overlays one of the flat surfaces 58 of the hexagonal flange 54 to inhibit relative rotation between the base ring 20 and the flange 54.

It should be noted that the internal diameter of the base ring 20, and the stress indicator rings 16 and 18 is slightly greater than the outside diameter of the male connector 50 at an unthreaded portion 84 (FIG. 2) next to the flange 54. Preferably the axial extent of the rings 16, 18 and 20 at their internal diameters does not exceed the axial extent of the unthreaded portion 84, to permit accommodation of the rings 16, 18 and 20 on the unthreaded portion 84.

If desired, the finger 42 and the recess 58 can be omitted and replaced by providing the major base surface 36 with an enhanced frictional coefficient, or a self-stick adhesive, for example, to bind the base ring 20 on the hexagonal flange 54.

The stress indicating ring 18 is then slipped past the threaded portion 52 of the male connector 50 onto the unthreaded portion 84, next to the base ring 20 such that the red concave face 30 overlaps the red tapered conical surface 40 of the base ring 20 whereby the red surfaces are substantially obscured from view in the radial direction.

The stress indicating ring 16 is oriented next to the stress indicating ring 18 on the unthreaded portion 84 of the male connector 50 such that the blue convex face 22 is next to but divergent from the blue convex face 28 of the stress indicating ring 18.

With the stress indicating rings 16 and 18 and the base ring 20 thus positioned on the unthreaded portion 84 of the male connector 50, the nut 60 is engaged with the thread 52 of the male connector in the manner shown in FIG. 7. The blue color code of the convex faces 22 and 28 is the visually predominant color when the male connector 50 and the nut 60 are in a less than optimally tight condition. The blue color code thus signifies to an installer as well as an inspector that the fasteners are less than optimally tight, thereby prompting further tightening of such fasteners.

The engaged fastener arrangement 12 includes the front ferrule 76 aligned with the internally tapered mouth 56 of the male connector 50 and the back ferrule 80 accommodated in the nut 60, also in alignment with the front ferrule 76. The tube 14, which is of a predetermined outside diameter that closely matches the inside diameter of the front ferrule 76 and the back ferrule 80, in accordance with known tube fitting specifications, is preinstalled in the nut 60 and the ferrules 76, 80 in the manner shown in FIG. 7.

As shown in FIGS. 7 and 10, when the nut 60 and the male connector 50 are tightened to a less than optimally tight condition, also referred to as a relatively loose condition, the stress rings 16 and 18 remain in their initially installed orientation wherein the blue color coded convex faces 22 and 28 diverge from each other and are visually apparent. The white concave face 24, because of its concavity is substantially obscured from view when the stress indicator 10 is viewed in a radial direction. Thus the blue color coded convex faces 22 and 28 of the stress indicating rings 16 and 18 are the predominant visually apparent surfaces of the stress indicator 10 when the tightening torque imposed upon the fastener arrangement 12 is less than the optimum tightness condition. Visual apparency of the blue color should thus prompt an installer to further tighten the fastener arrangement 12.

Further tightening of the male connector 50 and the nut 60 will cause the nut 60 to bear against the periphery of the stress indicating ring 16. It should be noted that the stress indicating rings 16 and 18 are constructed in a known manner with predetermined deflectable characteristics such that the stress indicating ring 16 deflects from the position of FIG. 7 to the position of FIG. 8 when the male connector 50 and the nut 60 are tightened to the optimum torque level. The optimum torque level is a known torque level corresponding to an optimum swage condition that provides a leaktight seal between the fastener arrangement 12 and the tube 14.

Thus at a predetermined optimally tight condition of the nut 60 on the male connector 50, the axial movement of the stress indicating ring 16 by the nut 60 will cause the ring 16 to deflect from the position of FIG. 7 to the position of FIG. 8. Such deflection of the stress indicating ring 16 will render the blue face 22 concave and the white face 24 convex. The concave blue face 22 of the ring 16 thus overlaps the convex blue face 28 of the stress indicator ring 18, as shown in FIG. 8, such that both of the blue color coded faces 22 and 28 are obscured from radial view. The red concave face 30 of the stress indicator ring 18 remains overlapped against the red tapered conical surface 40 of the base ring 20 such that the red color coded surfaces are substantially obscured from radial view.

When the male connector 50 and the nut 60 are tightened to the optimum torque condition, the white color coded convex face 24 of the stress indicator ring 16 and the white color coded peripheral edges 26 and 32 of the stress indicator rings 16 and 18 are the most predominant visually apparent surfaces of the mechanical stress indicator 10. Accordingly, the white color coded surface 24 and the white peripheral edges 26 and 32 correspond to the optimum torque condition of the fastener arrangement 12 and alert an installer or inspector that no further tightening is required. In the event that the fastener arrangement 12 inadvertently loosens due to vibration, for example, the stress indicator rings will deflect back to indicate the blue color corresponding to the less than optimally tight condition.

If the fastener arrangement 12 is subjected to an inadvertent overtightening beyond the optimum tightness condition, the deflector stub 70 of the nut 60 will bear against the stress indicator rings 16 and 18 to deflect both rings from the position of FIG. 8 to the position of FIG. 9, to indicate an overtight condition. With the fastener arrangement 12 in an overtight condition, the stress indicating ring 18 overlaps the stress indicating ring 16 such that the blue face 22 and the white face 24 of the stress indicating ring 16 are substantially obscured from radial view.

Also, in the overtight condition, the blue face 28 of the stress indicating ring 18 is rendered concave and the red face 30 is rendered convex. The red face 30 thus diverges away from the red tapered conical surface 40 of the base ring 20. Accordingly, the red face 30 of the stress indicating ring 18 and the red tapered conical surface 40 of the base ring 20 are the predominant visually apparent surfaces when the fastener arrangement 12 is in the overtight condition, since such surfaces diverge from each other as shown in FIG. 9.

The red surfaces 30 and 40, when visually apparent, are thus correlated with an overtight condition of the fastener arrangement 12 to immediately indicate to an installer or inspector that the fastener arrangement 12 is in an overtight condition.

The stress indicator 10 can be adapted to visually indicate that the fastener arrangement has been overtightened eve if the applied torque is subsequently loosened. Accordingly, the stress indicator ring 18 can be bonded with a predetermined bond strength to the red tapered conical surface 40 in a prestressed deflected condition before the tightening operation on the fastener arrangement 12 is begun. Thus when the fastener arrangement 12 is in an overtight condition, the stress indicating ring 18 will be deflected, with the deflection force being of sufficient magnitude to release the bond of the deflection ring 18 from the red tapered conical surface 40. The deflection ring 18 will then assume a relaxed position against the stress indicating ring 16. Therefore subsequent loosening of the nut 60 relative to the male connector 50 will not change the overtight deflected orientation of the stress indicating ring 18.

The option of bonding the stress indicating ring 18 to the red conical surface 40 such that the red surface remains exposed once an overtight condition has occurred helps assure that an overtightening of the fastener arrangement 12 will be recognized and that the fastener arrangement is replaced, if desired.

As will be apparent to those skilled in the art, the mechanical stress indicator 10 can be used with fasteners other than tube fittings to indicate whether such fasteners are in a less than optimal tightness condition, an optimal tightness condition or an overtight condition. In accordance with known technology the stress indicating rings can be constructed to deflect at predetermined stress levels to correspond with the tightness condition of a fastener arrangement such that the color coded surfaces of the stress rings clearly indicate the particular tightness condition of the fastener arrangement. Other types of coding, such as numbers, can be applied to the ring surfaces to correspond with the respective conditions of relative looseness, optimum tightness and overtightness.

Some advantages of the present invention evident from the foregoing description include a mechanical stress indicator that is easily adaptable to conventional and nonconventional fastener arrangements. The mechanical stress indicator can be formed to respond to specific stress or torquing levels such that a deflection of one or more members of the stress indicator will expose predominant visually apparent surfaces to alert an installer exactly when the fastener arrangement is in a condition of optimum tightness to thereby cease further tightening. Subsequent inspection of the fastener arrangement is easy to evaluate because of the color coded stress disks.

In view of the above, it will be seen that the several objects of the invention are achieved and other advantageous results attained.

As various changes can be made in the above constructions and method without departing from the scope of the invention, it is intended that all matter contained in the above description or shown in the accompanying drawings shall be interpreted as illustrative and not in a limiting sense.

What is claimed is:

1. A mechanical stress indicator kit for a fitting comprising,
    a) first and second nestable annular spring washers having, in diametrical cross section, the profile of a frustum of a cone,
    b) each of said washers having first and second surfaces and an unstressed condition wherein said first surfaces have an outside taper and said second surfaces have an inside taper,
        i) said washers being respectively deflectable in response to respective predetermined first and second stresses such that each said first surface when deflected has an inside taper and each said second surface when deflected has an outside taper, one of said washers being redeflectable from the deflected condition to a redeflected condition wherein said first surface, when redeflected, has an outside taper and said second surface, when redeflected, has an inside taper,
        ii) said first surface of each said washer having a first indicia, said second surface of said first washer having a second indicia, and said second surface of said second washer having a third indicia,
        iii) said first, second and third indicia being different,
    c) said first and second washers adapted to be supported in a predetermined position in the unstressed condition between two engageable members of a fitting that, when engaged, are relatively movable toward each other to tighten said fitting against said washers to squeeze the washers between the fitting members and exert stress on the washers when said fitting is being tightened, the predetermined position of said washers characterized by the first surfaces with outside taper of each of said washers confronting each other without nesting, to expose the first indicia on each of said first surfaces, to signify when said fitting is in a less than optimally tight condition, d) said first washer having a first predetermined spring constant such that said first washer is deflectable against said second washer in response to a first predetermined stress imposed by the engagable members of said fitting on said first washer when said engagable members are tightened to an optimally tight condition wherein the deflected first surface with inside taper of the first washer is netable over the first surface with outside taper of the second washer to conceal the first indicia on the first surfaces of each of said washers and expose the second indicia on the deflected second surface with outside taper of said first washer to signify that said fitting is in the optimum tightness condition, e) said second washer having a second predetermined spring constant such that said second washer can deflect in response to a second predetermined stress imposed on the second washer by the engageable members of said fitting when said engagable members are tightened beyond the optimum tightness condition to a predetermined overtight condition, and upon such deflection of the second washer, the second washer is adapted to cause the nested first washer to redeflect wherein the redeflected first surface with outside taper of the first washer is nestable in the deflected first surface with inside taper of the second washer to conceal the first indicia on the first surfaces of said washers, and expose the third indicia on the deflected second surface with outside taper of the second washer to signify that sad fitting is in said predetermined overtight condition.

2. The kit as claimed in claim 1 wherein at least one of said washers is formed of metal.

3. The kit as claimed in claim 1 wherein at least one of said washers is formed of plastic.

4. The kit as claimed in claim 1 wherein said first and second washers have edge portions containing said second indicia.

5. The kit as claimed in claim 1 wherein said first, second and third indicia are different colors.

6. The kit as claimed in claim 1 further including a non-deflectable insert member adapted to be interposed between one of said washers and one of said fitting members to promote deflection of said one of said washers.

7. The kit as claimed in claim 6 wherein said insert member has an axially directed projection of predetermined extent.

8. The kit as claimed in claim 6 wherein said insert member is of annular shape.

9. The kit as claimed in claim 6 wherein said insert member is formed of a rigid metal.

10. The kit as claimed in claim 6 wherein said inset member is formed of a rigid plastic.

11. The kit as claimed in claim 6 wherein said insert member has an outside tapered surface adapted to nest in the first surface with inside taper of said one of said washers when said one of said washers is in a non-deflected condition.

12. The kit as claimed in claim 11 wherein the outside tapered surface of said insert member includes the third indicia and is positioned next to the first surface with inside taper of said second washer such that the third indicia of said insert member is exposed with the third indicia of the deflected second surface with outside taper of said second washer to signify when said fitting is in said predetermined overtight condition.

13. A mechanical stress indicator kit for a fitting comprising, a) first and second nestable annular spring washers having, in diametrical cross section, the profile of a frustum of a cone, b) each of said washers having first and second surfaces and an unstressed condition wherein said first surfaces have an outside taper and said second surfaces have an inside taper, i) said washers being respectively deflectable in response to respective predetermined first and second stresses such that each said first surface when deflected has an inside taper and each said second surface when deflected has an outside taper, said washers being redeflectable from the deflected condition to a redeflected condition wherein each said first surface, when redeflected, has an outside taper and each said second surface, when redeflected, has an inside taper, ii) said first surface of said first washer having a first indicia and the second surface of said first washer having a second indicia, the first surface of said second washer having a third indicia and the second surface of said second washer having the first indicia, iii) said first, second and third indicia being different, c) means for releasably holding said second washer in a deflected condition, d) said first and second washers and said means for holding said second washer in a deflected condition adapted to be supported in a predetermined position between two engagable members of a fitting that, when engaged, are relatively movable toward each other to tighten said fitting against said washers to squeeze the washers between the fitting members and exert stress on the washers when said fitting is being tightened, the predetermined position of said washers characterized by the first surface with outside taper of said first washer confronting the deflected second surface with outside taper of the second washer to expose the first indicia on the first and second washers to signify when said fitting is in a less than optimally tight condition, e) said first washer having a first predetermined spring constant such that said first washer is deflectable against said second washer in response to a first predetermined stress imposed by the engagable members of said fitting on said first washer when said engageable members are tightened to an optimally tight condition, wherein the deflected first surface with inside taper of the first washer is nestable over the deflected second surface with outside taper of the second washer to conceal the first indicia on the first and second washers and expose the second indicia on the deflected second surface with outside taper of said first washer to signify that said fitting is in the optimum tightness condition, f) said second washer having a second predetermined spring constant such that said second washer can redeflect away from the means for holding the second washer in a deflected condition, in response to a second predetermined stress imposed on said second washer by the engagable members of said fitting when said engagable members are tightened beyond the optimum tightness condition to a predetermined overtight condition, and upon such redeflection the second washer is adapted to cause the nested first washer to redeflected wherein the redeflected first surface with outside taper of the first washer is nestable int the redeflected second surface with inside taper of the second washer to conceal the first indicia on the first and second washers and expose the third indicia on the redeflected first surface with outside taper of the second washer to signify that said fitting is in said predetermined overtight condition.

14. The kit as claimed in claim 13 wherein said releasable holding means includes a non-deflectable annular insert member adapted to be interposed between said second washer and one of said fitting members to promote deflection of said second washer, and means for releasably joining said second washer to said insert member.

15. The kit as claimed in claim 14 wherein said insert member has an outside tapered surface adapted to nest in the deflected first surface with inside taper of said second washer when said second washer is joined to said insert member.

16. The kit as claimed in claim 14 wherein said joining means include an adhesive bonding material having a predetermined bond strength adapted to unbond when the second predetermined stress is imposed on said second washer.

17. A method of indicating mechanical stress in a fitting comprising, a) forming first and second deflectable nestable annular spring washers having the profile of a frustum of a cone in diametrical cross section an first and second surfaces wherein in an unstressed condition of the washers, the first surfaces have an outside taper and the second surfaces have an inside taper, the washers being respectively deflectable in response to respective predetermined first and second stresses such that each said firs surface when deflected has an inside taper and each said second surface when deflected has an outside taper with one of the washers being redeflectable from the deflected condition to a redeflected condition wherein the first surface, when redeflected, has an outside taper and the second surface, when redeflected, has an inside taper, b) applying a first indicia to the firs surface of each said washer, a second indicia to the second surface of the first washer, an a third indicia to the second surface of the second washer such that the first, second and third indicia are different, c) installing the first and second washers in an unstressed condition between two engagable members of a fitting, that, when engaged, are relatively movable toward each other to tightened the fitting, d) positioning the washers between the fitting members such that the firs surfaces with outside taper of each of said washers confront each other without nesting to expose the first indicia on each of the first surfaces and thereby signify when the fitting is in a less than optimally tight condition, e) engaging the members of the fitting with the first and second washers disposed therebetween and moving the fitting members toward each other against the washers to squeeze the washers between the fitting members and exert stress on the washers when the fitting is being tightened, f) providing the first washer with a first predetermined spring constant that enables the first washer to deflect against the second washer in response to a first predetermined stress imposed on said first washer by the engagable members of said fitting that corresponds to an optimally tight condition of the fitting members, and tightening the fitting amount that deflects the first washer wherein the deflected first surface with inside taper of the first washer nests over the first surface with outside taper of the second washer to conceal the first indicia on the first surfaces of each of said washers, and expose the second indicia on the deflected second surface with outside taper of said first washer to signify that the fitting is in the optimum tightness, condition, and g) providing the second washer with a second predetermined spring constant that enables the second washer to deflect in response to a second predetermined stress imposed on the second washer by the engagable members of said fitting when said engagable members are tightened beyond the optimum tightness condition to a predetermined overtight condition, and upon such deflection of the second washer, the second washer is adapted to cause the nested first washer to redeflected wherein the redeflected first surface with outside taper of the first washer nest in the deflected first surface with inside taper of the second washer to conceal the first indicia on the first surfaces of said washers, and expose the third indicia on the deflected second surface with outside taper of the second washer to signify that the fitting is in the predetermined overtight condition.

* * * * *